(12) United States Patent
Kim et al.

(10) Patent No.: US 8,085,368 B2
(45) Date of Patent: Dec. 27, 2011

(54) LIQUID CRYSTAL DISPLAY AND METHOD OF FABRICATING THE SAME

(75) Inventors: Soon-Dong Kim, Pyeongtaek-si (KR); Seung-Gyu Tae, Osan-si (KR); Se-Jin Chung, Yongin-si (KR); Jun-Hee Moon, Yongin-si (KR); Myung-Woo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 12/684,150

(22) Filed: Jan. 8, 2010

(65) Prior Publication Data

US 2010/0182553 A1    Jul. 22, 2010

(30) Foreign Application Priority Data

Jan. 21, 2009    (KR) .................. 10-2009-0005229

(51) Int. Cl.
*G02F 1/133*    (2006.01)

(52) U.S. Cl. .......................................... 349/116; 349/28

(58) Field of Classification Search .................. 349/28, 349/116
See application file for complete search history.

(56) References Cited

U.S. PATENT DOCUMENTS

| 6,243,155 | B1* | 6/2001 | Zhang et al. | 349/199 |
| 2010/0165267 | A1* | 7/2010 | Yoshida et al. | 349/106 |

* cited by examiner

*Primary Examiner* — Phu Vu
(74) *Attorney, Agent, or Firm* — H.C. Park & Associates, PLC

(57) ABSTRACT

A liquid crystal display and a simple method to fabricate the same are provided, which can accurately measure luminance of an external light. The liquid crystal display includes a substrate; a thin film transistor array formed on the substrate; and a photoelectric conversion element having a reflection pattern formed on at least one side of the substrate, a photoelectric conversion region provided with a first semiconductor region formed on an upper part of the reflection pattern to receive an external light reflected by the reflection pattern, and a dummy pattern formed on an upper part of the photoelectric conversion region with a width corresponding to the first semiconductor region. The photoelectric conversion region may be configured to adjust the quantity of light incident to the thin film transistor array.

18 Claims, 12 Drawing Sheets

LIQUID CRYSTAL DISPLAY AND METHOD OF FABRICATING THE SAME

CROSS REFERENCE TO RELATED APPLICATION

This application claims priority from and the benefit of Korean Patent Application No. 10-2009-0005229, filed on Jan. 21, 2009, which is hereby incorporated by reference for all purposes as if fully set forth herein.

BACKGROUND OF THE INVENTION

1. Field of the Invention

Exemplary embodiments of the present invention relate to a liquid crystal display and a method of fabricating the same. In particular, exemplary embodiments of the present invention relate to a liquid crystal display that can accurately measure luminance of an external light and has a simplified fabricating process.

2. Description of the Background

A liquid crystal display (LCD) is one of the most widely used flat panel displays. An LCD may include two substrates on which electrodes are formed, and a liquid crystal layer interposed between the two substrates. Liquid crystal molecules of the liquid crystal layer may be rearranged in accordance with voltages applied to the electrodes, and thereby a quantity of light passing through the liquid crystal layer may be adjusted.

Since the liquid crystal molecules display an image by changing light transmission in accordance with a direction and intensity of the electric field, the LCD may require a backlight unit that emits light. In order to reduce the power consumption of the backlight unit, a technique of adjusting the luminance of a backlight in accordance with an external light has recently been developed. In order to implement such a technique, the liquid crystal display may require a light meter capable of accurately measuring the luminance of the external light.

SUMMARY OF THE INVENTION

Exemplary embodiments of the present invention are described herein in view of the above-mentioned problems, and provide a liquid crystal display, and, more particularly, a liquid crystal display having a mechanism to accurately measure the luminance of an external light.

Exemplary embodiments also provide a simple method of fabricating such the liquid crystal display.

Additional advantages, objects, and features of the exemplary embodiments will be set forth in the description which follows, and in part will be apparent from the description to a person having ordinary skill in the art, or may be learned from practice of the exemplary embodiments.

An exemplary embodiment of the present invention discloses a liquid crystal display comprising a substrate, a thin film transistor array formed on the substrate, and a photoelectric conversion element. The photoelectric conversion element comprises a reflection pattern, a photoelectric conversion region, and a dummy pattern. The reflection pattern is formed on at least one side of the substrate. The photoelectric conversion region is provided with a first semiconductor region formed on an upper part of the reflection pattern. The photoelectric conversion region receives an external light reflected by the reflection pattern. The dummy pattern is formed on an upper part of the photoelectric conversion region. The dummy pattern has with a width corresponding to the first semiconductor region, and adjusting a quantity of the external light incident to the thin film transistor array.

Another exemplary embodiment of the present invention discloses a method of fabricating a liquid crystal display. The method comprises disposing a substrate and forming a thin film transistor array on the substrate. The method further comprises forming a photoelectric conversion element having a reflection pattern formed on at least one side of the substrate. The method further comprises forming a photoelectric conversion region comprising a first semiconductor region formed on an upper part of the reflection pattern to receive an external light reflected by the reflection pattern. The method further comprises forming a dummy pattern on an upper part of the photoelectric conversion region. The photoelectric conversion region having a width corresponding to the first semiconductor region. The method further comprises detecting a quantity of the external light incident to the thin film transistor array.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
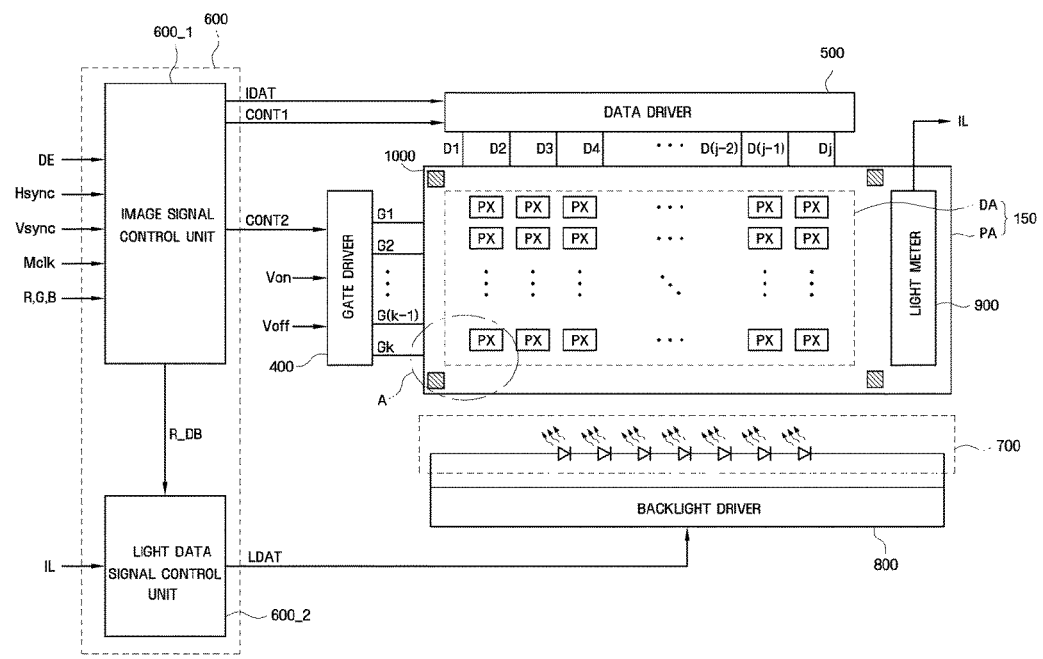
FIG. 1 illustrates a block diagram of a liquid crystal display according to exemplary embodiments of the present invention.

Hereinafter, preferred embodiments of the present invention will be described in detail with reference to the accompanying drawings. The aspects and features of the present invention and methods for achieving the aspects and features will be apparent by referring to exemplary embodiments to be described in detail with reference to the accompanying drawings. However, the present invention is not limited to the exemplary embodiments disclosed hereinafter, but can be implemented in various forms. The matters defined in the description, such as the detailed construction and elements, are nothing but specific details provided to assist those of ordinary skill in the art in a comprehensive understanding of the invention, and the exemplary embodiments are only defined within the scope of the appended claims. In the drawings, sizes and relative sizes of layers and areas may be exaggerated for clarity in explanation.

The term "on" that is used to designate that an element is on another element located on a different layer or a layer includes both a case where an element is located directly on another element or a layer and a case where an element is located on another element via another layer or still another element. By contrast, the term "directly on" means that an element is directly on another element or a layer without intervention of any other element or layer. In the entire description of the present invention, the same drawing reference numerals are used for the same elements across various figures. Also, the term "and/or" includes the respective described items and combinations thereof.

Spatially relative wordings "below", "beneath", "lower", "above", "upper", and so forth, as illustrated in the drawings, may be used to facilitate the description of relationships between an element or constituent elements and another element or other constituent element. The spatially relative wordings should be understood as wordings that include different directions of the element in use or operation in addition to the direction illustrated in the drawings.

In the following description of the present invention, exemplary embodiments of the present invention will be described with reference to plane views and sectional views which are ideal schematic views. The form of exemplary views may be modified due to the manufacturing techniques and/or allowable errors. Accordingly, the exemplary embodiments of the present invention are not limited to their specified form as illustrated, but include changes in form being produced according to manufacturing processes. Accordingly, areas exemplified in the drawings have rough properties, and the shapes of areas in the drawings are to exemplify specified forms of areas of elements, but do not limit the scope of the present invention.

Figure 2:
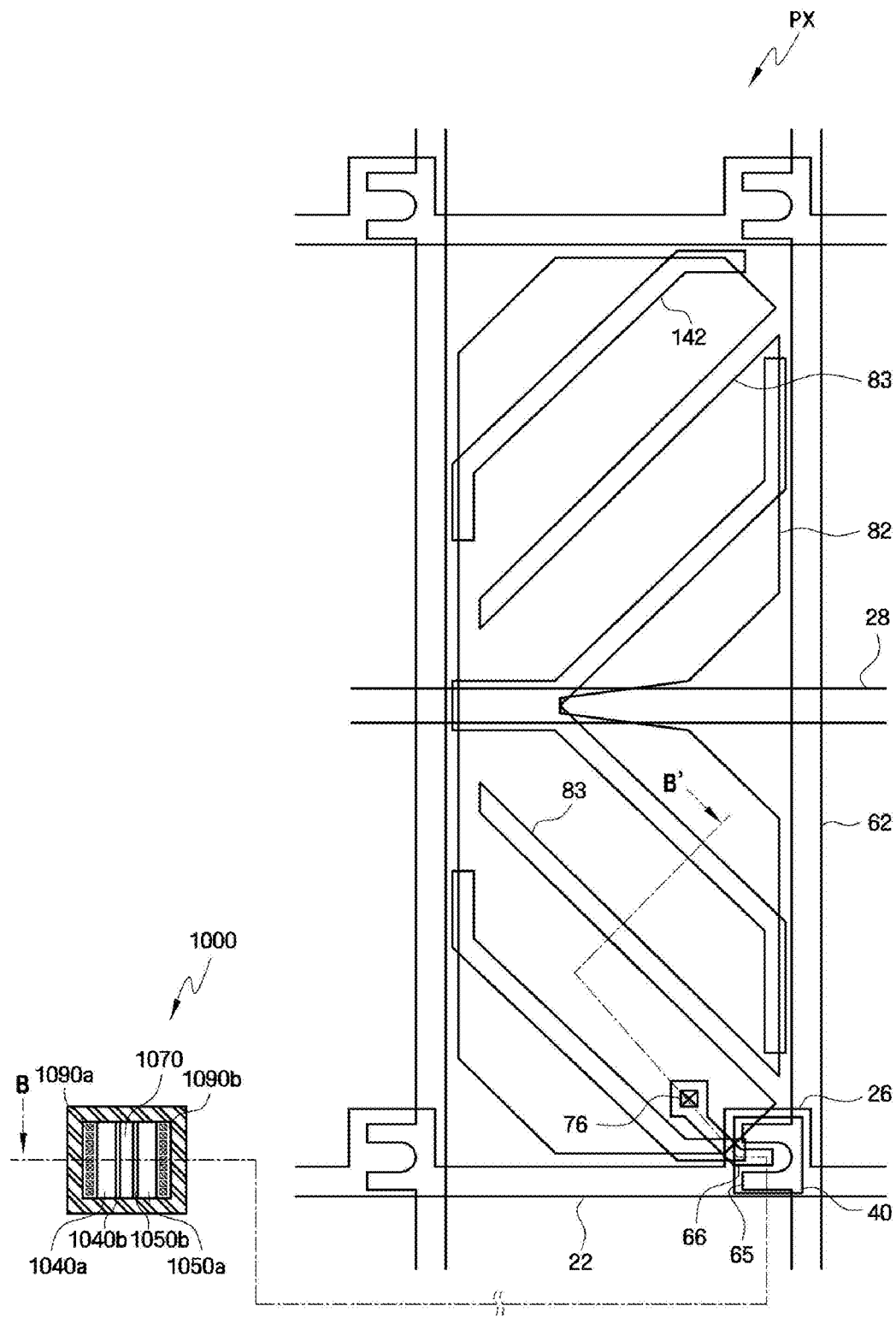
FIG. 2 shows a layout diagram of a liquid crystal panel included in a liquid crystal display according to exemplary embodiments of the present invention.

Hereinafter, with reference to FIG. 1, FIG. 2, FIG. 3, FIG. 4, FIG. 5, FIG. 6A, and FIG. 6B, a liquid crystal display (LCD) according to exemplary embodiments of the present invention will be described in detail. FIG. 1 illustrates a block diagram of a LCD. FIG. 2 illustrates a layout diagram of a liquid crystal panel included in a LCD, and FIG. 3 is a section view taken along line B-B' of the liquid crystal panel in FIG. 2.

Referring to FIG. 1, the LCD may include a liquid crystal panel 150 having a display area DA (e.g., a thin film transistor array), where an image is displayed, and a non-display area PA where light measurement units 900 and 1000 are packaged. The liquid crystal panel 150 may further include a signal control unit 600 having an image signal control unit 600_1, a light data signal control unit 600_2, a gate driver 400, a data driver 500, a backlight driver 800, and a light-emitting block 700 connected to the backlight driver 800. The backlight driver 800 and the light-emitting block 700 may form a backlight unit together with reflection sheets, a light guide plate, and a lower receptacle. The reflection sheets, the light guide plate, and the lower receptacle in the backlight unit are not illustrated in FIG. 1. The data driver 500, the signal control unit 600, and the backlight unit 800 may be packaged on the liquid crystal panel 150 in the form of a single drive chip.

Figure 3:
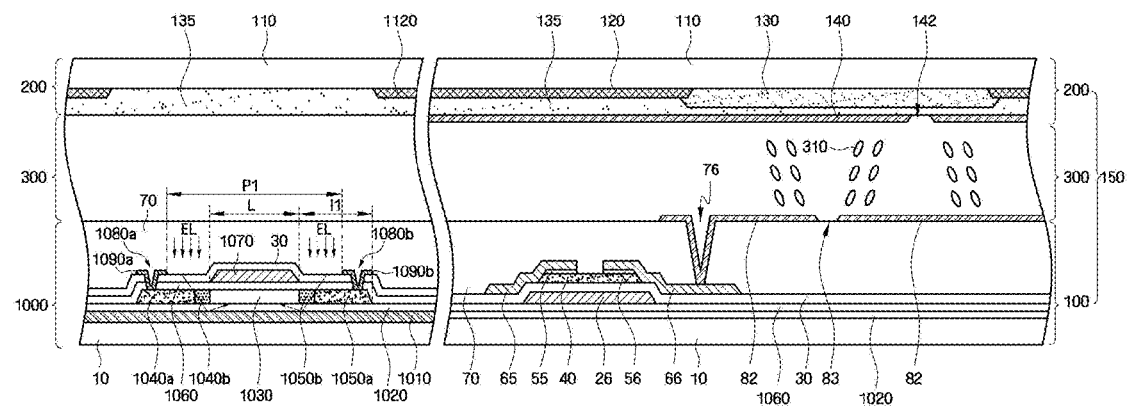
FIG. 3 is a section view taken along line B-B' of the liquid crystal panel shown in FIG. 2.

Referring to FIG. 1, FIG. 2, and FIG. 3, the liquid crystal panel 150 may include a first substrate 100, a second substrate 200, and a liquid crystal layer 300 interposed between the first and second substrates 100 and 200. The first substrate 100 may include a plurality of gate lines G1 to Gk, a plurality of data lines D1 to Dj, and a plurality of pixels PX, and may receive light from the backlight unit to display an image. The respective pixels PX may be defined in regions where the respective gate lines G1 to Gk and the respective data lines D1 to Dj cross each other. Although not illustrated in the drawing, each pixel PX may be divided into a red sub-pixel, a green sub-pixel, and a blue sub-pixel.

According to exemplary embodiments, an electric field may be formed by two electrodes arranged on the first substrate 100 and the second substrate 200, respectively. An alignment of the liquid crystal molecules 310 may vary according to the electric field. For example, the liquid crystal molecules 310 may have a different alignment based on the electric field formed by a pixel electrode PE of the first substrate 100 and a common electrode CE of the second substrate 200. That is, the alignment of the liquid crystal molecules 310 may be changed so that each pixel PX may display a desired image.

Referring again to FIG. 1, the liquid crystal panel 150 may be divided into a display area DA where an image is displayed and a non-display area PA where no image is displayed.

The display area DA may include a plurality of pixels PX, and each pixel PX may display an image in response to an image data voltage provided by the data driver 500.

The first substrate 100 in the non-display area PA may be wider than the second substrate, and no image may be displayed in the non-display area PA. The light measurement units 900 and 1000 may be packaged in the non-display area PA. The light measurement units 900 and 1000 may calculate a luminance level IL of a backlight in accordance with the luminance of an external light, and may provide a calculated luminance level to the signal control unit 600.

The signal control unit 600 may receive a first image signal RGB and external control signals Vsync, Hsync, Mclk, and DE, and may output a second image signal IDAT, a data control signal CONT1, a gate control signal CONT2, and a light data signal LDAT. The control signals Vsync, Hsync, Mclk, and DE may control the first image signal RGB, and a backlight luminance level IL.

The signal control unit 600 may convert the first image signal RGB into the second image signal IDAT to output the second image signal IDAT. The signal control unit 600 may also receive the backlight luminance level IL provided by the light measurement units 900 and 1000, and may provide the compensated light data signal LDAT to the backlight driver 800 in accordance with the backlight luminance level IL.

The signal control unit 600 may be divided into an image signal control unit 600_1 and a light data signal control unit 600_2. The image signal control unit 600_1 may control the image displayed on the liquid crystal panel 150, and the light data signal control unit 600_2 may control the backlight driver 800. In some cases, the image signal control unit 600_1 and the light data signal control unit 600_2 may be physically separated from each other. In other cases, the image signal control unit 600_1 and the light data signal control unit 600_2 may be combined in one unit.

The image signal control unit 600_1 may receive the first image signal RGB, and may output the second image signal IDAT corresponding to the first image signal RGB. The image signal control unit 600_1 may receive the external control signals Vsync, Hsync, Mclk, and DE, and may generate the data control signal CONT1 and the gate control signal CONT2. Examples of the external control signals include, but are not limited to, the vertical synchronization signal Vsync, the horizontal synchronization signal Hsync, the main clock signal Mclk, and the data enable signal DE. The data control signal CONT1 may be a signal for controlling the operation of the data driver 500, and the gate control signal CONT2 may be a signal for controlling the operation of the gate driver 400.

The image signal control unit 600_1 may receive the first image signal RGB, and may output, to the light data signal control unit 600_2, a representative image signal R_DB corresponding to the first image signal.

The light data signal control unit 600_2 may receive the representative image signal R_DB and the backlight luminance level IL, and may provide the compensated light data signal LDAT to the backlight driver 800.

The gate driver 400 may receive the gate control signal CONT2 from the image signal control unit 600_1, and may apply the gate signal to the gate lines G1 to Gk. The gate signal may be a combination of a gate-on voltage Von and a gate-off voltage Voff provided from a gate-on/off voltage generation unit (not illustrated). The gate control signal CONT2, a signal to control the operation of the gate driver 400, may include: a vertical start signal for starting the operation of the gate driver 500; a gate clock signal for determining an output time of the gate-on voltage; and an output enable signal for determining a pulse width of the gate-on voltage. Although not illustrated in the drawing, the gate driver 400 may be implemented in the form of a plurality of gate driver chips.

The data driver 500 may receive the data control signal CONT1 from the image signal control unit 600_1, and may apply a voltage corresponding to the second image signal IDAT to the data lines D1 to Dj. The voltage corresponding to the second image signal IDAT may be a voltage provided from a grayscale voltage generation unit (not illustrated). That is, the voltage corresponding to the second image signal IDAT may be a voltage obtained by dividing a driving voltage of the grayscale voltage generation unit in accordance with the grayscale of the second image signal IDAT. The data control signal CONT1 may include a signal for controlling the operation of the data driver 500. The signal for controlling the operation of the data driver 500 may include a horizontal start signal for starting an operation of the data driver 500, and an output command signal for commanding an output of an image data voltage. Although not illustrated in the drawing, the data driver 500 may be implemented in the form of a plurality of data driver chips.

The backlight driver 800 may adjust the luminance of the backlight provided from the light-emitting block 700 in response to the light data signal LDAT. The luminance of the light-emitting block 700 may differ in accordance with a pulse width or a duty rate of the light data signal LDAT.

The light-emitting block 700 may include at least one light source that may provide light to the liquid crystal panel 150. For example, the light-emitting block 700, as illustrated in the drawing, may include a light emitting diode LED that is one of a point light source. The light source may be a line light source or a surface light source. The luminance of the light-emitting block 700 may be controlled by the backlight driver 800 connected to the light-emitting block 700.

Referring to FIG. 2 and FIG. 3, the liquid crystal panel included in the LCD will be described in further detail.

The LCD may include the first substrate 100 and the second substrate 200 facing the first substrate 100. The liquid crystal layer 300 may be interposed between the two substrates 100 and 200.

The first substrate 100 in the LCD may include a thin film transistor array formed on a substrate 10, and a photoelectric conversion element 1000 that may determine a quantity of light incident to the thin film transistor array.

The substrate 10 may be made of glass, such as soda lime glass and borosilicate glass, and/or plastic. Each pixel PX included in the thin film transistor array may include a plurality of elements, such as a pixel electrode 82 on which a first domain forming means 83, may be formed.

On the substrate 10 of the pixel region, for example, a blocking film 1020 made of silicon oxide may be formed. On the blocking film 1020, a first gate insulating film 1060 made of silicon nitride ($SiN_x$) may be formed.

On the first gate insulating film 1060, for example, gate interconnections 22, 26, and 28, which include a gate line 22, a gate electrode 26, and a storage interconnection 28 formed in a horizontal direction, respectively, may be formed. The gate interconnections 22, 26, and 28 may be made of aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chrome (Cr), titanium (Ti), and/or tantalum (Ta). In general, the gate interconnections 22, 26, and 28 may be formed using any suitable material and combinations thereof.

On the gate interconnections 22, 26, and 28, a second gate insulating film 30 made of silicon nitride ($SiN_x$) or silicon oxide ($SiO_2$), a transistor semiconductor layer 40 made of hydrogenated amorphous silicon or polycrystalline silicon, and ohmic contact layers 55 and 56 made of silicide or n+hydrogenated amorphous silicon doped with high-density n-type impurities may be formed. In general, the second gate insulating film 30, the transistor semiconductor 40, and ohmic contact layers 55 and 56 may be formed using any suitable material and combinations thereof.

On the ohmic contact layers 55 and 56 and the second gate insulating film 30, for example, data interconnections, which include a data line 62, a source electrode 65, and a drain electrode 66 may be formed. The drain electrode 66 may be formed in a vertical direction.

A passivation layer 70 may be formed on the data line 62, the drain electrode 66, and the exposed transistor semiconductor layer 40 as an insulating layer. On the passiviation layer 70, a first contact hole 76 for exposing the drain electrode 66 may be formed.

Also, on the passivation layer 70, a pixel electrode 82 electrically connected to the drain electrode 66 through the first contact hole 76 may be formed for each pixel. For example, the pixel electrode 82 may be physically and electrically connected to the drain electrode 66 through the first contact hole 76 to receive a data voltage from the drain electrode 66. The pixel electrode 82 may be made of a transparent conductive material, such as ITO (Indium Tin Oxide) or IZO (Indium Zinc Oxide), or a reflective conductive material such as aluminum.

The pixel electrode 82 may be divided into a plurality of domain regions by a first domain forming means 83. The first domain forming means 83 may, for example, be a cutout pattern formed by patterning (e.g., a first aperture) the pixel electrode 82. In particular, the first domain forming means 83 may include a horizontal part formed in a horizontal direction at a position where the pixel electrodes 82 may be divided into upper and lower halves The first domain forming means 83 may also include tilting parts formed in a tilting direction in upper and lower halves of the pixel electrode 82, respectively. The upper and lower tilting parts may be perpendicular to each other thereby allowing uniform distribution of the horizontal electric field in four directions. The tilting parts may be tilted at angles of approximately 45° and −45° to the gate line 22, respectively, and the first domain forming means 83 may have a structure in which the upper and lower parts of the pixel region are substantially symmetrical over a line that divides the pixel region into upper and lower halves (e.g., a line parallel to the gate line). For example, as illustrated in FIG. 2, on the pixel electrode 82 positioned in an upper part of the pixel, the tilting part of the first domain forming means 83 may be tilted at an angle of 45° relative to the gate line 22, while on the pixel electrode 82 positioned in a lower part of the pixel, the tilting part of the first domain forming means 83 may be tilted at an angle of −45° relative to the gate line 22. It should be understood that a shape and arrangement of the tilting parts of the first domain forming means 83 may be modified in various forms, for example, where the tilting parts of the first domain forming means 83 are substantially at angles of 45° and −45° to the gate line 22.

As described above, by using the first domain forming means 83 of the pixel electrode 82 and a second domain forming means 142 of a common electrode 140 to be described hereinafter, the display region of the pixel electrode 82 may be divided into a plurality of domains in accordance with a direction of main directors of the liquid crystal molecules 310 in the liquid crystal layer 300. The term "domain" may refer to a liquid crystal region where the directors of the liquid crystal molecules 310 may be inclined to a specified direction by an electric field formed between the pixel electrode 82 and the common electrode 140.

On the pixel electrode 82 and the passivation layer 70, a first vertical alignment layer (not illustrated) capable of aligning the liquid crystals may be formed. The first vertical alignment layer and a second vertical alignment layer (not illustrated) to be described hereinafter, vertically align the liquid crystal molecules 310.

The second substrate 200 may include a plurality of elements such as the common electrode 140 formed on an upper substrate 110. The second substrate 200 may have a second domain forming means 142 formed thereon, and may be arranged to face the first substrate 100.

On the upper substrate 110, a black matrix 120 for preventing a light leak and defining a pixel area may be formed. Red, green, and blue color filters 130 may be successively arranged on the pixel region between the black matrices 120. An overcoat layer 135 for smoothing the unevenness of the color filters may be formed on the color filters 130. On the overcoat layer 135, the common electrode 140 made of a transparent conductive material such as ITO or IZO may be formed.

The common electrode 140 may be divided into a plurality of domain regions by the second domain forming means 142. The second domain forming means 142, for example, may be a cutout pattern (e.g., a second aperture formed in the common electrode 140) formed by patterning the common electrode 140. The second domain forming means 142 may include tilting parts alternately arranged in parallel to the tilting parts of the first domain forming means 83, and may have end parts overlapping edges of the pixel electrode 82. The end parts of the second domain forming means 142 may include a vertical end part and a horizontal end part.

The tilting parts of the first domain forming means 83 of the pixel electrode 82 and the tilting parts of the second domain forming means 142 of the common electrode 140 may be arranged in parallel to each other in the same direction. In some cases, the tilting parts of the first domain forming means 83 of the pixel electrode 82 and the tilting parts of the second domain forming means 142 of the common electrode 140 may be alternately arranged to form a horizontal electric field. Although a vertical electric field generated by using the first aperture and the second aperture as the first and second domain forming means 82 and 142 has been described, it should be understood various types of electric fields and different means to generate these fields may be possible. For example, the vertical electric field may also be formed by using protrusions as the first and second domain forming means 82 and 142.

On the common electrode, a second vertical alignment layer (not illustrated) that may vertically align the liquid crystal molecules 310 may be formed. The second vertical alignment layer may be made of the same material as the first vertical alignment layer.

As noted above, liquid crystal layer 300 may be interposed between the first substrate 100 and the second substrate 200.

The liquid crystal molecules 310 included in the liquid crystal layer 300 may have negative dielectric anisotropy, and may be, for example, nematic liquid crystal molecules 310. The liquid crystal molecules 310 interposed between the pixel electrode 82 and the common electrode 140 may be pre-tilted, and in somes cases, results in improving the response speed of the liquid crystal molecules 310.

Figure 4:
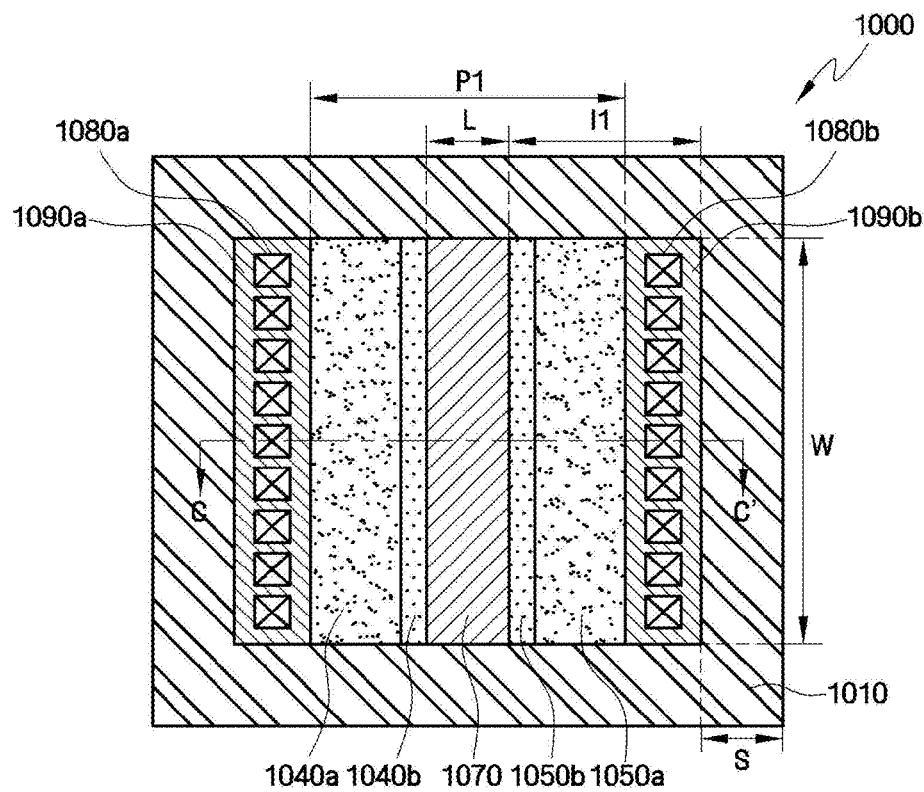
FIG. 4 is a layout diagram of a photoelectric conversion element included in a liquid crystal display according to exemplary embodiments of the present invention.

Hereinafter, with reference to FIG. 1, FIG. 2, FIG. 3, FIG. 4, and FIG. 5, a photoelectric conversion element according to exemplary embodiments of the present invention will be described in detail. FIG. 4 is a layout diagram of a photoelectric conversion element included in the LCD according to exemplary embodiments of the present invention, and FIG. 5 is a sectional view taken along line C-C' of the photoelectric conversion element in FIG. 4.

Figure 5:
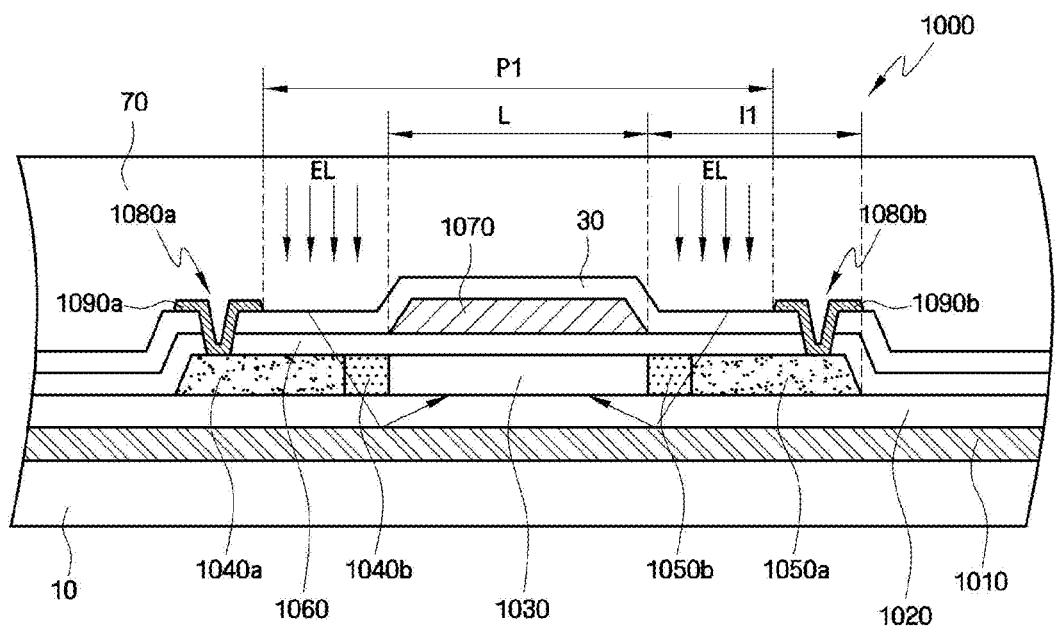
FIG. 5 is a sectional view taken along line C-C' of the photoelectric conversion element in FIG. 4.

Referring to FIG. 4 and FIG. 5, in the non-display area PA of the liquid crystal panel 150, the light measurement units 900 and 1000 may be packaged. At least one light measurement unit 1000, i.e. one photoelectric conversion element, may be arranged in at least one of four corners of the liquid crystal panel 150. The photoelectric conversion element 1000 may measure an external light and may help adjust the quantity of light incident from the backlight unit to the thin film transistor array.

The photoelectric conversion element 1000 may be formed on the first substrate 100. The photoelectric conversion element 1000 may include: a reflection pattern 1010 formed on one side of the substrate 10; photoelectric conversion regions 1030, 1040a, 1040b, 1050a, and 1050b formed on an upper part of the reflection pattern 1010 to receive an external light reflected by the reflection pattern 1010; and a dummy pattern 1070 formed on upper parts of the photoelectric conversion regions 1030, 1040a, 1040b, 1050a, and 1050b with a width corresponding to the photoelectric conversion regions 1030, 1040a, 1040b, 1050a, and 1050b.

The reflection pattern 1010 may prevent the light emitted from the backlight unit from reaching the photoelectric conversion regions 1030, 1040a, 1040b, 1050a, and 1050b because, in some cases, the reflection pattern 1010 may be made of an optically non-transmissive material (e.g., Mo and/or Cr). The reflection pattern 1010 may reflect the external light incident between the dummy pattern 1070 and a first interconnection pattern 1090a or between the dummy pattern 1070 and a second interconnection pattern 1090b, and may direct the reflected light incident to the first semiconductor region 1030 that is the light-receiving region of the photoelectric conversion regions 1030, 1040a, 1040b, 1050a, and 1050b.

The reflection pattern 1010 may be formed in various forms (e.g., a tetragon or a circle). The reflection pattern 1010 may have an area that is larger than that of the photoelectric conversion regions 1030, 1040a, 1040b, 1050a, and 1050b to cover the whole area of the photoelectric conversion regions 1030, 1040a, 1040b, 1050a, and 1050b. For example, the reflection pattern 1010 may have an edge S extending from the edges of the photoelectric conversion regions 1030, 1040a, 1040b, 1050a, and 1050b. For example, in some cases, the reflection pattern 101 may extend beyond the the photoelectric conversion regions 1030, 1040a, 1040b, 1050a, and 1050b for more than 40 μm.

A blocking film 1020 for insulating the reflection pattern 1010 and the photoelectric conversion regions 1030, 1040a, 1040b, 1050a, and 1050b may be formed on the reflection pattern 1010. The blocking film 1020 may be made of a light transmissive material (e.g., silicon oxide or silicon nitride) to minimize loss of light reflected from the reflection pattern 1010.

The photoelectric conversion regions 1030, 1040a, 1040b, 1050a, and 1050b may be formed on an upper part of the blocking film 1020. The photoelectric conversion regions 1030, 1040a, 1040b, 1050a, and 1050b may be semiconductor regions 1030, 1040a, 1040b, 1050a, and 1050b made of polysilicon.

For example, the photoelectric conversion regions 1030, 1040a, 1040b, 1050a, and 1050b may include a first semiconductor region 1030, second semiconductor regions 1040a and 1040b, and third semiconductor regions 1050a and 1050b. The first to third semiconductor regions 1030, 1040a, 1040b, 1050a, and 1050b may be doped with impurities having different polarities.

The first semiconductor region 1030 may be an I-type semiconductor region formed of intrinsic semiconductor having no doped impurity. The first semiconductor region 1030 may receive the external light reflected from the reflection pattern 1010, and may generate electron-hole pairs. The first semiconductor region 1030 may function as a channel region of the photoelectric conversion element 1000, and a channel length L of the first semiconductor region 1030 may be in the range of approximately 2.5 to 20 μm. The channel length L may be determined based on a sensitivity of the photoelectric conversion element 1000. The channel width W of the first semiconductor region 1030 may be determined based on a sensitivity of the photoelectric conversion element, and may be, for example, approximately 10,000 μm. It should be appreciated that, in general, various dimensions may be used for the channel width W and channel length L.

The second semiconductor regions 1040a and 1040b may be, for example, semiconductor regions doped with P-type impurities. The second semiconductor regions 1040a and 1040b may be divided into a second high-density semiconductor region 1040a and a second low-density semiconductor region 1040b.

The third semiconductor regions 1050a and 1050b may be, for example, semiconductor regions doped with N-type impurities. The third semiconductor regions 1050a and 1050b may be divided into a third high-density semiconductor region 1050a and a third low-density semiconductor region 1050b.

The second semiconductor regions 1040a and 1040b or the third semiconductor regions 1050a and 1050b may be formed with a first width I1. The first width I1 may be determined to increase the quantity of light incident to the reflection pattern 1010.

The dummy pattern 1070 and the first gate insulating film 1060 for insulating the photoelectric conversion regions 1030, 1040a, 1040b, 1050a, and 1050b may be formed on the upper parts of the photoelectric conversion regions 1030, 1040a, 1040b, 1050a, and 1050b. The first gate insulating film 1060 may be made of silicon oxide or, in general, any suitable material.

The dummy pattern 1070 may be formed with a width corresponding to the first semiconductor region 1030 on the first gate insulating film 1060. In some cases, the dummy pattern 1070 may be made of the same material as the gate interconnections 22, 26, and 28. In some cases, the dummy pattern 1070 may have the same width L as the first semiconductor region 1030.

The second gate insulating film 30 may be formed on the dummy pattern 1070. The second gate insulating film 30, as described above, may be formed over the whole substrate 10.

A second contact hole 1080a and a third contact hole 1080b may be formed on the first gate insulating film 1060 and the second gate insulating film 30. A plurality of second contact holes 1080a and third contact holes 1080b may be formed. In order to maximize the inflow amount of external light EL, the second contact hole 1080a and the third contact hole 1080b may be formed on the outmost parts of the second semiconductor regions 1040a and 1040b and the third semiconductor regions 1050a and 1050b.

A first interconnection pattern 1090a may be in contact with the second semiconductor regions 1040a and 1040b through the second contact hole 1080a, and a second interconnection pattern 1090b may be in contact with the third semiconductor regions 1050a and 1050b through the third contact hole 1080b.

In some cases, a width P1 of a gap between the first interconnection pattern 1090a and the second interconnection pattern 1090b may not be less than twice the channel length L of the first semiconductor region 1030, but may be up to 10 times the channel length L. If the width P1 of the gap between the first interconnection pattern 1090a and the second interconnection pattern 1090b exceeds 10 times the channel length L of the first semiconductor region, the area occupied by the photoelectric conversion element 100 may be too wide. If the width P1 is less than twice the channel length L, the quantity of light that is reflected from the reflection pattern 1010 and is incident to the first semiconductor region 1030 may be insignificant.

If the width P1 of the gap between the first interconnection pattern 1090a and the second interconnection pattern 1090b is not less than twice the channel length L, but up to 10 times the channel length L, the external light EL may be incident to spaces between the first interconnection pattern 1090a and the dummy pattern 1070 and between the second interconnection pattern 1090b and the dummy pattern 1070. The incident external light EL may then pass through the second semiconductor regions 1040a and 1040b and the third semiconductor regions 1050a and 1050b, be reflected by the reflection pattern 1010, and be incident to the first semiconductor region 1030 to generate electron-hole pairs. The generate holes and electrons may move to the second semiconductor regions 1040a and 1040b and the third semiconductor regions 1050a and 1050b, respectively, and may then move to an external circuit through the first interconnection pattern 1090a and the second interconnection pattern 1090b, respectively, hereby allowing the quantity of light of the backlight unit to be adjusted.

The passivation layer 70 may be formed on upper parts of the second gate insulating film 30, the first interconnection pattern 1090a, and the second interconnection pattern 1090b.

Figure 6A:
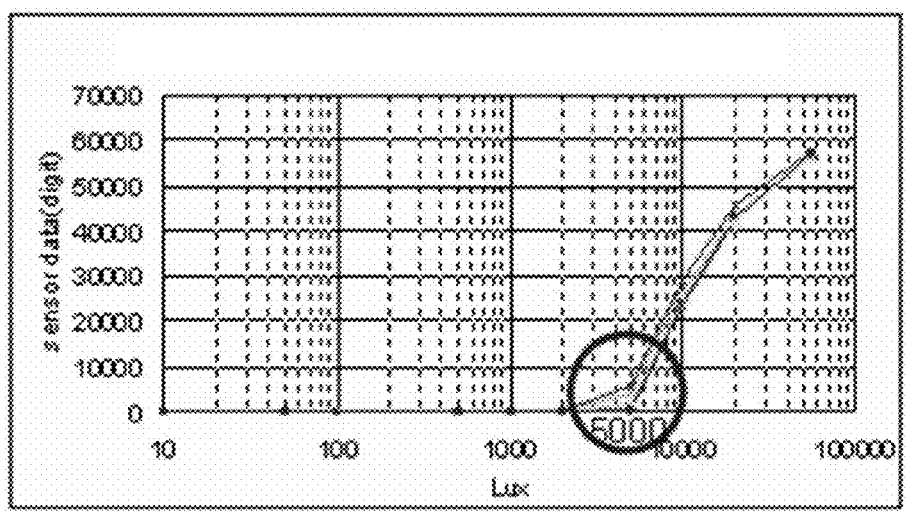
FIG. 6A and FIG. 6B are graphs illustrating a characteristic of a photoelectric conversion element included in a liquid crystal display according to exemplary embodiments of the present invention.
Figure 6B:
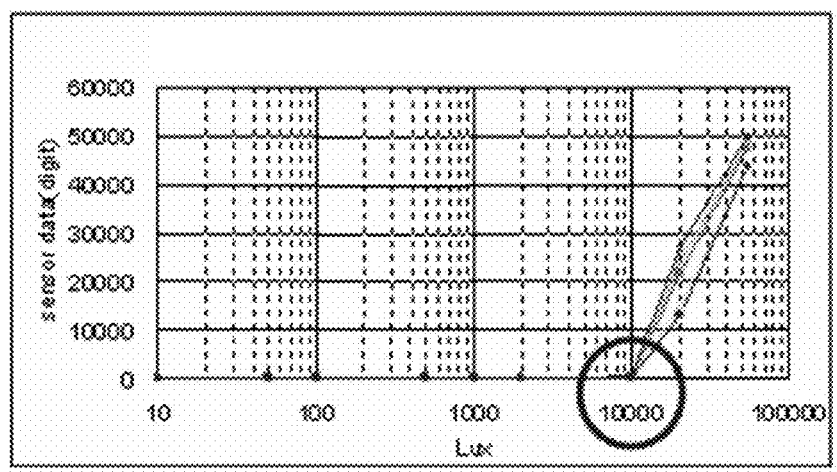

Referring to FIG. 6A and FIG. 6B, characteristics of the photoelectric conversion element according to exemplary embodiments of the present invention will be described. FIGS. 6A and 6B are graphs illustrating characteristics of the photoelectric conversion element in the LCD.

Referring to FIG. 6A, in some cases, a photoelectric conversion element 1000 may react to the external light when an external light of over 5,000 LUX (luminous flux per unit area) is incident. By contrast, in other cases, the width of the gap between the first interconnection pattern 1090a and the second interconnection pattern 1090b may be narrow causing external light to only be incident to the second and third low-density semiconductor regions 1040b and 1050b. Accordingly, in such cases, the photoelectric conversion element 1000 may react to the external light only when an external light of over 10,000 LUX is incident, as illustrated in FIG. 6B. That is, due to the existence of the dummy pattern 1070, the quantity of light incident to the first semiconductor region 1030 may be decreased. In comparison, the photoelectric conversion element 1000 illustrated in FIG. 6A may have a larger width P1 of the gap between the first interconnection pattern 1090a and the second interconnection pattern 1090b, thereby enabling the photoelectric conversion element 1000 to operate using a relatively small amount of light without having to remove the dummy pattern.

Hereinafter, with reference to FIG. 2, FIG. 3, FIG. 7, FIG. 8, FIG. 9, FIG. 10, FIG. 11, FIG. 12, FIG. 13, FIG. 14, FIG. 15, FIG. 16, FIG. 17, and FIG. 18, a method of fabricating an LCD according to exemplary embodiments of the present invention will be described. FIG. 7, FIG. 8, FIG. 9, FIG. 10, FIG. 11, FIG. 12, FIG. 13, FIG. 14, FIG. 15, FIG. 16, FIG. 17, and FIG. 18 are sectional views illustrating processes of a method to fabricate an LCD.

Figure 7:
FIG. 7, FIG. 8, FIG. 9, FIG. 10, FIG. 11, FIG. 12, FIG. 13, FIG. 14, FIG. 15, FIG. 16, FIG. 17, and FIG. 18 are sectional views illustrating successive steps in a method of fabricating a liquid crystal display according to exemplary embodiments of the present invention.

Referring to FIG. 7, a substrate 10 may be provided. The substrate 10 may be in the form of a flat plate.
A reflection pattern 1010 may be formed on the substrate 10 by, for example, laminating metal films (not illustrated) and patterning the formed metal films.

Figure 8:
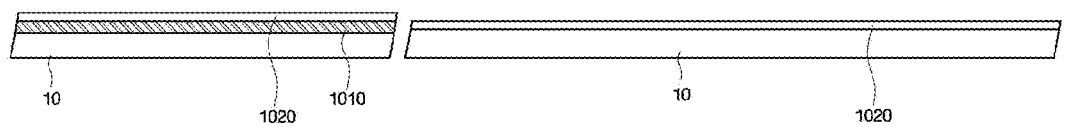

Referring to FIG. 8, a blocking film 1020 may be formed on the reflection pattern 1010 using, for example, plasma-enhanced CVD (PECVD).

Figure 9:
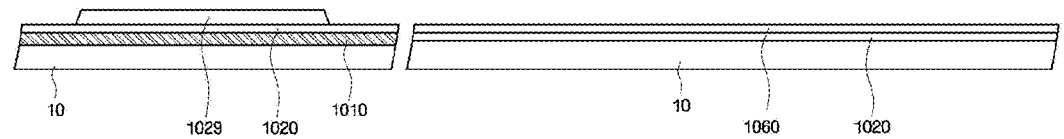

Referring to FIG. 9, a preliminary photoelectric conversion region 1029 made of any suitable material including, for example, polysilicon, may be formed on the blocking film 1020 on at least one side of the substrate 10. To form the preliminary photoelectric conversion region 1029, a pattern (not illustrated) composed of amorphous silicon may be formed on one side of the substrate 10, and then the amorphous silicon pattern may be crystallized. Any suitable method of crystallizing amorphous silicon into polysilicon may be used including, for example, using excimer laser annealing (ELA) or sequential lateral solidification (SLS).

ELA may refer to a technique to convert amorphous silicon into polysilicon by partially melting the amorphous silicon through irradiation of pulse type laser beams onto the amorphous silicon in a short time period of about 30~200 nanoseconds, and then solidifying the melted amorphous silicon.

SLS may refer to a technique to convert amorphous silicon into polysilicon by completely melting the amorphous silicon through irradiation of laser beams, having passed through a patterned mask, onto a specified region of the amorphous silicon, and then solidifying the melted amorphous silicon. In SLS, crystals may be continuously grown by moving a stage on which a laser or amorphous silicon is placed and irradiating the laser beams onto the previously formed crystals as seeds.

Figure 10:
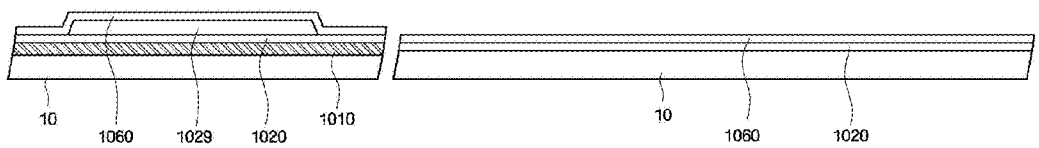

Referring to FIG. 10, a first gate insulating film 1060 may be formed on the preliminary photoelectric conversion region 1029 and the substrate 10 using any suitable method including, for example, PECVD.

Figure 11:
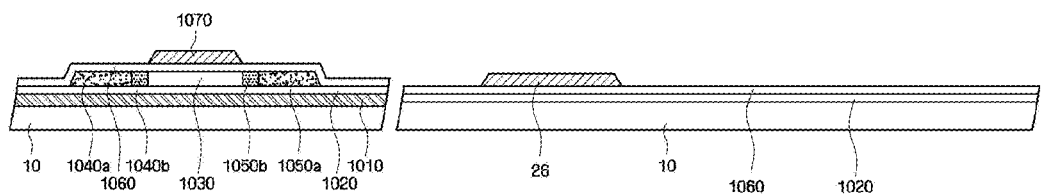

Referring to FIG. 11, by depositing a conductive film for gate interconnection on the first gate insulating film 1060, and by patterning the deposited conductive film, gate interconnections 22, 26, and 28 may be formed on a pixel region and a dummy pattern 1070 may be formed on at least one side of the substrate 10. The dummy pattern 1070 may be used as a mask pattern for forming a first semiconductor region (See "1030" in FIG. 3) made of intrinsic semiconductor having no doped impurity on the lower part of the dummy pattern 1070 and for forming second semiconductor regions 1040a and 1040b and third semiconductor regions 1050a and 1050b having doped impurities on both sides of the dummy pattern 1070.

Figure 12:
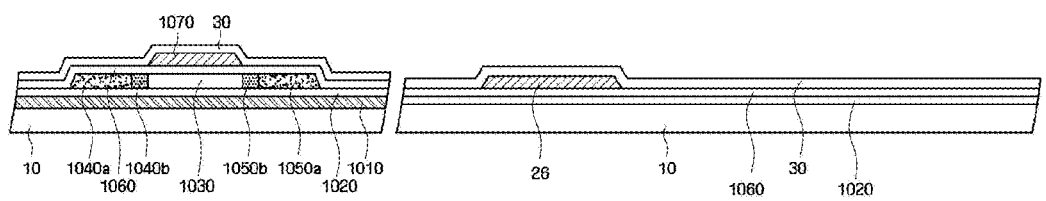

Referring to FIG. 12, a second gate insulating film 30 may be formed to cover the dummy pattern 1070 and the gate interconnections 22, 26, and 28 using any suitable method including, for example, PECVD. In some exemplary embodiments of the present invention, the dummy pattern 1070 may not be removed, and thus a separate mask and etching solution for removing the dummy pattern are not required. Accordingly, a time and cost of fabricating the LCD may be reduced.

Figure 13:
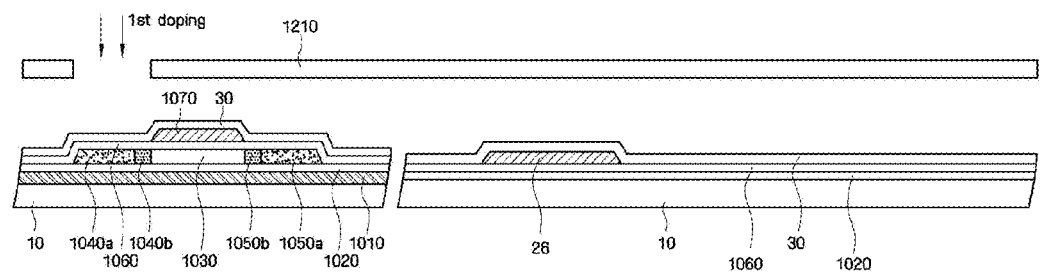

Referring to FIG. 13, the second semiconductor regions 1040a and 1040b may be formed on one side of the preliminary photoelectric conversion regions 1030, 1040a, 1040b, 1050a, and 1050b by a first doping of P-type impurities into regions 1040a and 1040b. In this case, preliminary photoelectric conversion regions 1030, 1050a, and 1050b may be protected using a first mask 1210. The first doping may be repeated however using a different ion density. The second P-type impurity doping may result in formation of the second semiconductor regions 1040a and 1040b as the second high-density semiconductor region 1040a and the second low-density semiconductor region 1040b.

Figure 14:
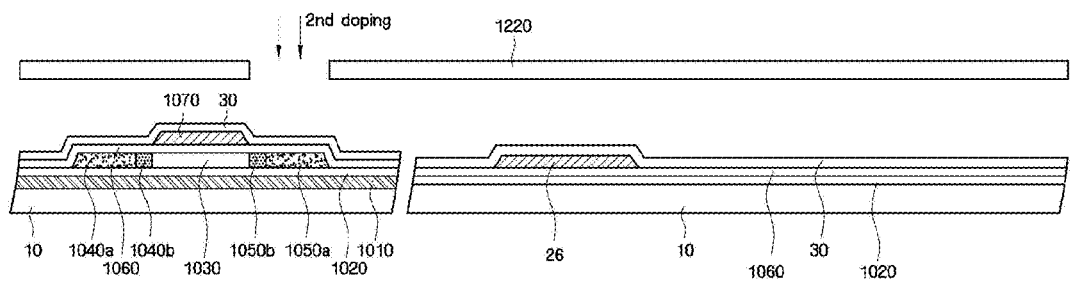

Referring to FIG. 14, the third semiconductor regions 1050a and 1050b may be formed on an opposite side of the second semiconductor regions 1040a and 1040b relative to the dummy pattern 1070 by performing a doping of N-type impurities into regions 1050a and 1050b. In this case, preliminary photoelectric conversion regions 1030, 1040a, and 1040b may be protected using a second mask 1220. The doping of N-type impurities may be repeated however using a different ion density. The repeated N-type impurity doping may result in formation of the third semiconductor regions 1050a and 1050b as the third high-density semiconductor region 1050a and the third low-density semiconductor region 1050b.

The first semiconductor region 1030 may be formed between the second semiconductor regions 1040a and 1040b and the third semiconductor regions 1050a and 1050b with a width corresponding to the dummy pattern 1070. The steps to form the second semiconductor regions 1040a and 1040b and the third semiconductor regions 1050a and 1050b may be reversed in order.

Figure 15:
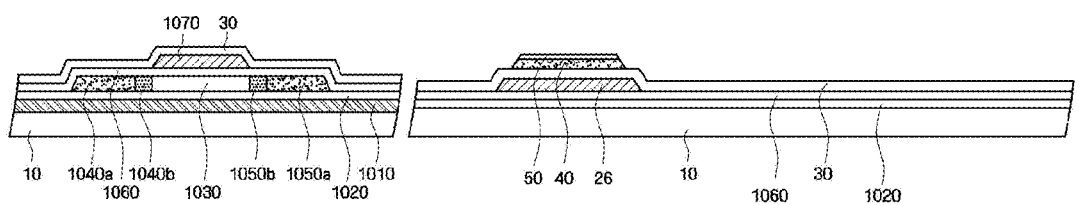

Referring to FIG. 15, a semiconductor layer 40 and an n+hydrogenated amorphous silicon layer 50 may be formed on the gate insulating film 30 in the pixel region PX. The semiconductor layer may be made of any suitable material including, for example, hydrogenated amorphous silicon or polysilicon, and the n+ hydrogenated amorphous silicon layer 50 may be doped with high-density n-type impurities Referring to FIG. 16, a second contact hole 1080a and a third contact hole 1080b may be formed on the first gate insulating film 1060 and the second gate insulating layer 30 relative to the second semiconductor regions 1040a and 1040b and the third semiconductor regions 1050a and 1050b. For example, the second and third contact holes 1080a and 1080b may be formed above the second semiconductor regions 1040a and 1040b and the third semiconductor regions 1050a and 1050b, respectively. A first interconnection pattern 1090a and a second interconnection pattern 1090b may also be formed. The first interconnection pattern 1090a may be in contact with the second semiconductor regions 1040a and 1040b through the second contact hole 1080a and the second interconnection pattern 1090b may be in contact with the third semiconductor regions 1050a and 1050b through the third contact hole 1080b. A conductive film for data interconnection may be deposited by sputtering on the n+ hydrogenated amorphous silicon layer 50 of the pixel region PX. Data interconnections 62, 65, and 66 including ohmic contact layers 55 and 56, a data line 62, a source electrode 65, and a drain electrode 66 may then be formed by etching the conductive film using a photolithography method. The data interconnections 62, 65, and 66 and the first interconnection pattern 1090a or the second interconnection pattern 1090b may be formed simultaneously by depositing and patterning the same conductive material.

Figure 16:
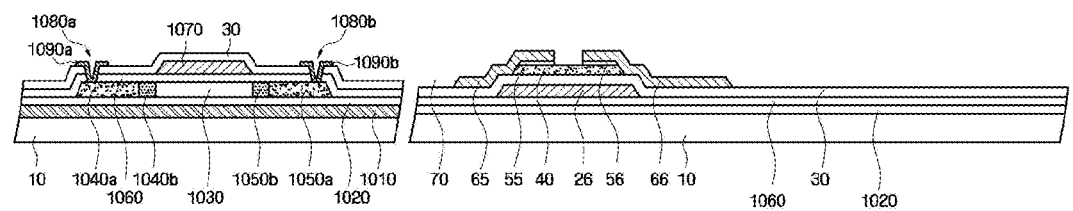
Figure 17:
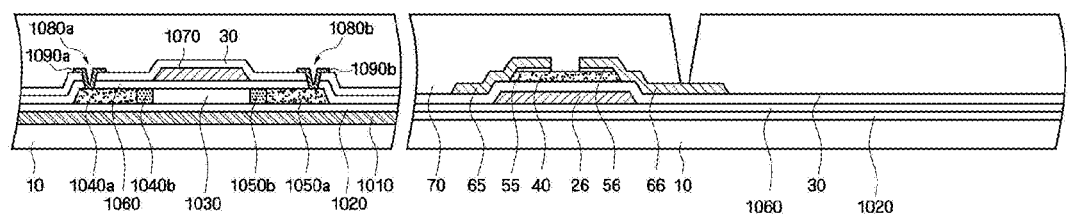

Referring to FIG. 17, a passivation layer 70 may be formed on the structure illustrated in FIG. 16 using a reactive chemical vapor deposition method.

Figure 18:
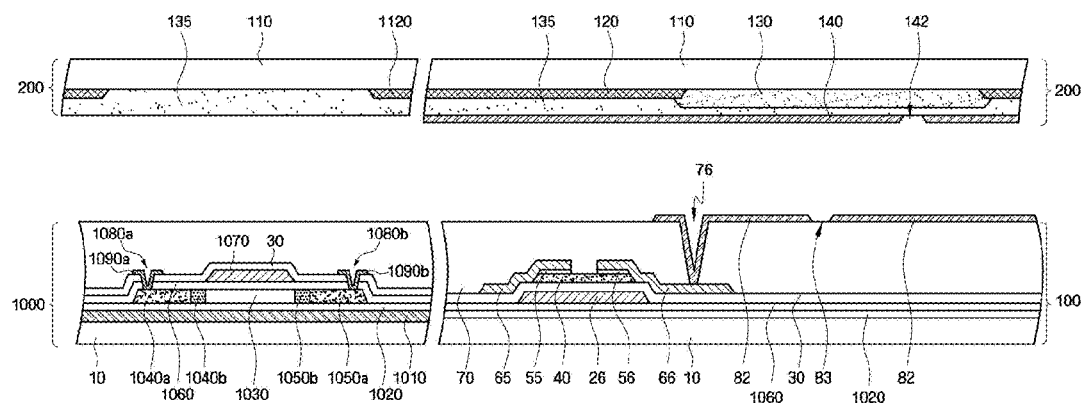

Referring to FIG. 18, a first contact hole 76 for exposing the drain electrode 66 may be formed. A first domain forming means 83 and a pixel electrode 82 may be formed by disposing and patterning a conductive material for the pixel electrode 82 on the passivation layer 70. The pixel electrode 82 may be formed having a horizontal part and tilting parts as described above, to improve transmission of light. The first domain forming means 83 may be formed with a narrow width and the pixel electrode 82 may be formed with a wide width.

Referring to FIG. 18, a second substrate 200, on which multiple elements, such as a common electrode 140 having a second domain forming means 142 formed thereon, may be formed. The second substrate may be arranged to face the first substrate 100.

To form the second substrate 200, a black matrix 120 and a shading pattern 1120 may be formed on the pixel region PX and a region corresponding to the photoelectric conversion element 1000, respectively, by depositing and selectively patterning an opaque material (e.g., chrome) on the upper substrate 110.

A color filter layer may be formed by spreading, for example, photoresist onto an upper part of the black matrix 120 and a front surface of the upper substrate 110 in the pixel region PX exposed by the black matrix 120. Red, green, and blue color filters 130 may be formed by exposing and developing the color filter layer. An overcoat layer 135 may be formed on the block matrix 120, the shading pattern 1120, and the color filters 130.

Then, the second domain forming means 142 and the common electrode 140 are formed by disposing and selectively patterning a conductive material for the common electrode onto the upper part of the overcoat layer 135.

Figure 19:
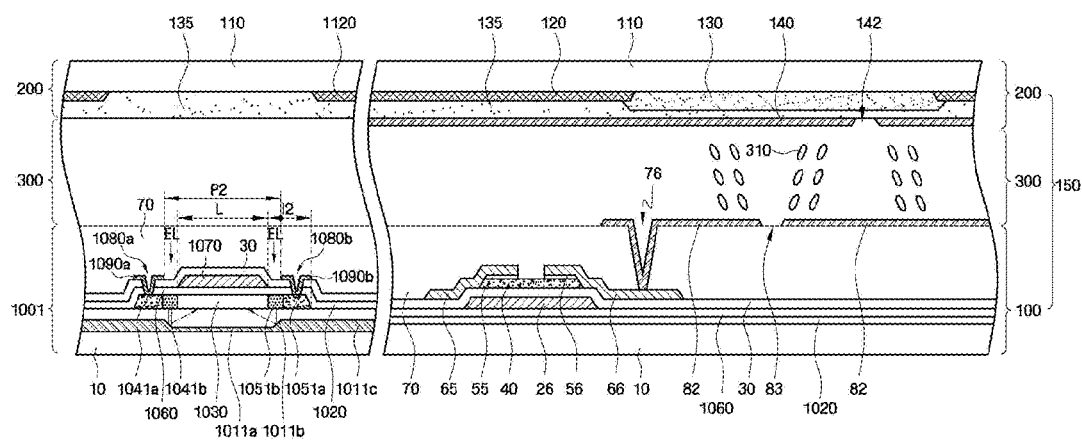
FIG. 19 is a sectional view taken along line B-B' of a liquid crystal panel included in the liquid crystal display shown in FIG. 2.

Referring to FIG. 3 and FIG. 19, the completed second substrate 200 may be arranged to face the first substrate 100, and spacers (not illustrated) for maintaining a distance between the first substrate 100 and the second substrate 200 may be used. The first and second substrates 100 and 200 may then be attached to each other by using sealants.

A backlight assembly including lamps and so on may be arranged on a lower part of the liquid crystal panel 150 including the first substrate 100, the second substrate 200, and the liquid crystal layer 300 to complete a liquid crystal display.

Figure 20:
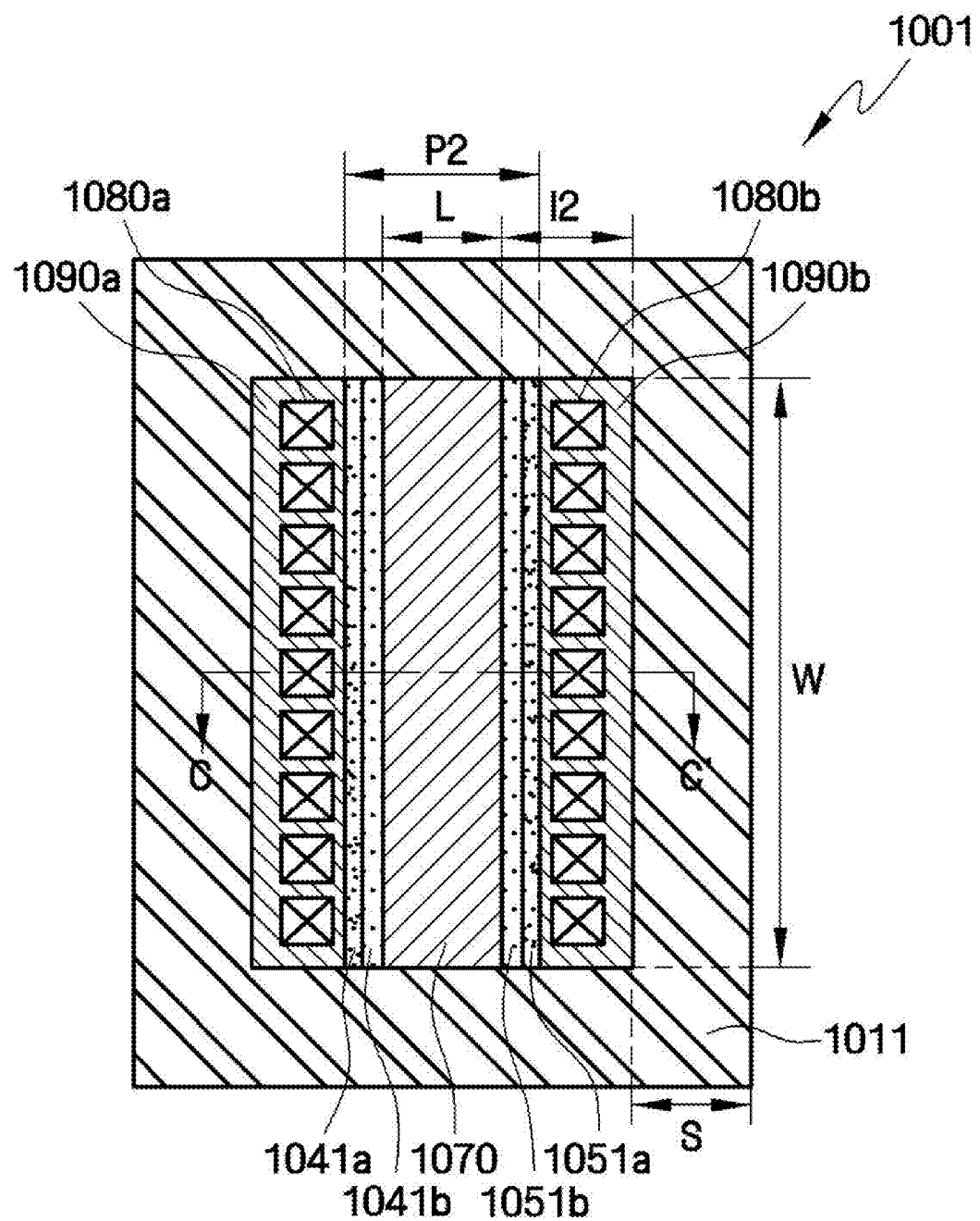
FIG. 20 is a layout diagram of a photoelectric conversion element included in a liquid crystal display according to exemplary embodiments of the present invention.
Figure 21:
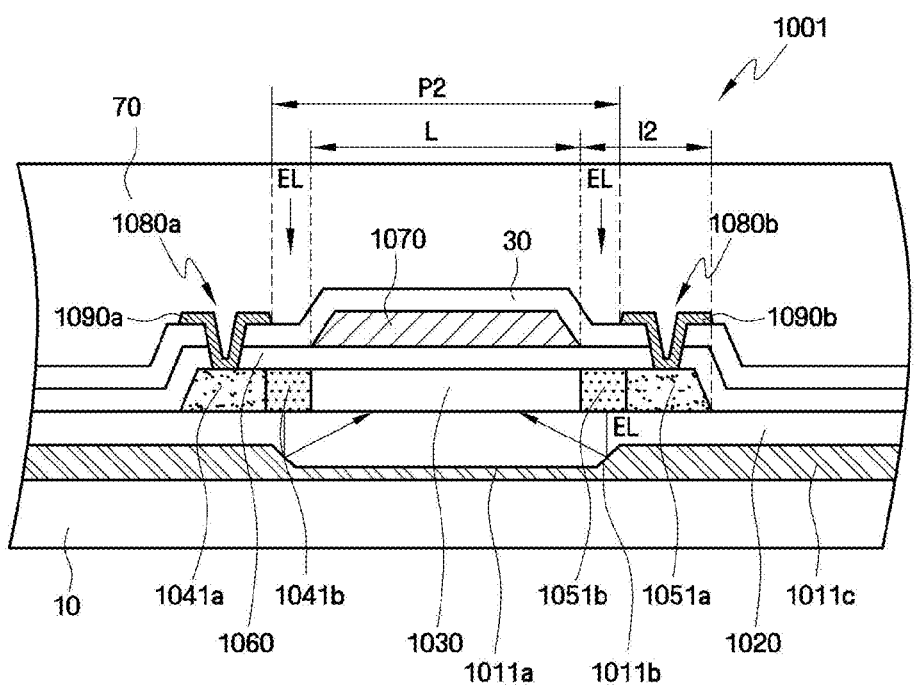
FIG. 21 is a sectional view taken along line D-D' of the photoelectric conversion element in FIG. 20.

Hereinafter, a method of fabricating a LCD according to exemplary embodiments of the present invention will be described with reference to FIGS. 19 to 21. FIG. 19 is a sectional view taken along line B-B' of the LCD shown in FIG. 2. FIG. 20 is a layout diagram of a photoelectric conversion element according to exemplary embodiments of the present invention. FIG. 21 is a sectional view taken along line D-D' of the photoelectric conversion element in FIG. 20.

Referring to FIGS. 20 and 21, second semiconductor regions 1041a and 1041b or third semiconductor regions 1051a and 105 1b of a photoelectric conversion element 1001 may be formed with a second width 12. Second and third contact holes 1080a and 1080b may be formed on first gate insulating film 1060 and second gate insulating film 30 relative to upper parts of the second semiconductor regions 1041a and 1041b and the third semiconductor regions 1051a and 1051b, respectively. A first interconnection pattern 1090a may be in contact with second semiconductor regions 1041a and 1041b through the second contact hole 1080a, and a second interconnection pattern 1090b may be in contact with third semiconductor regions 1051a and 1051b through the third contact hole 1080b. The width P2 of a gap between the first interconnection pattern 1090a and the second interconnection pattern 1090b may be greater than a channel length L of the first semiconductor region 1030. Accordingly, the external light EL may pass through a space between the width P2 of the gap and the channel length L of the first semiconductor region 1030, and then pass through the second low-density semiconductor region 1041b and the third low-density semiconductor region 1051b.

According to some exemplary embodiments of the present invention, reflection patterns 1011a, 1011b, and 1011c may include recessed parts 1011a and 1011b. The first semiconductor region 1030 may overlap recessed parts 1011a and 1011b. The recessed parts 1011a and 1011b may be formed by removing a portion of a flat part of the reflection pattern 1011c, and may include tilting surfaces 1011b. The tilting surfaces 1011b may be formed by gradually reducing the thickness of the portion of the flat part of the reflection pattern 1011c. The cross section of the recessed parts 1011a and 1011b may be implemented in various forms (e.g., in the form of a trapezoid, a semicircle, or an ellipse).

The light incident to the second low-density semiconductor region 1041b and the third low-density semiconductor region 1051b may be reflected by the tilting surfaces 1011b of the recessed parts 1011a and 1011b, and may then be incident to the first semiconductor region 1030 to generate electron-hole pairs. Because reflection patterns 1011a, 1011b, and 1011c include recessed parts 1011a and 1011b, the space between the gap width P2 and the channel length L of the first semiconductor region 1030 may be narrow. However, even if the width of the space through which the external light EL passes is narrow, the external light EL may be limited to the first semiconductor region 1030 due to the tilting surfaces 1011b of the recessed parts 1011a and 1011b, and thus the quantity of light incident to the first semiconductor region 1030 may be increased.

Figure 22:
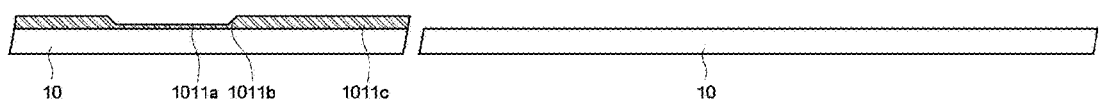
FIG. 22 and FIG. 23 are sectional views illustrating successive processes of a method of fabricating a liquid crystal display according to exemplary embodiments of the present invention.
Figure 23:
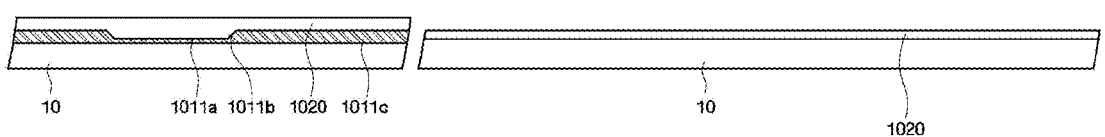

Hereinafter, with reference to FIG. 22 and FIG. 23, a method of fabricating a LCD according to some exemplary embodiments of the present invention will be described. FIG. 22 and FIG. 23 are sectional views illustrating processes of a method to fabricate a LCD.

First, in accordance with the processes as described above with reference to FIG. 7, a metal film (not illustrated) for implementing reflection patterns may be formed and then patterned.

Referring to FIG. 22, recessed parts 1011a and 1011b may be formed on the patterned metal film of the reflection patterns. The recessed parts 1011a and 1011b may be formed by wet-etching the patterned metal film for the reflection patterns to yield tilting surfaces, of which the thickness is gradually reduced, by irradiating laser onto the patterned metal film. Accordingly, reflection patterns 1011a, 1011b, and 1011c may include recessed parts 1011a and 1011b and flat part 1011c.

Referring to FIG. 23, a blocking film 1020 may be formed on the reflection patterns 1011a, 1011b, and 1011c. The blocking film 1020 may be formed to fill in the recessed parts 1011a and 1011b and to smooth the upper surfaces thereof.

Then, first and second substrates 100 and 200 are formed using the processes as described above with reference to FIG. 9, FIG. 10, FIG. 11, FIG. 12, FIG. 13, FIG. 14, FIG. 15, FIG. 16, FIG. 17, and FIG. 18, and attached to each other to complete a LCD including the photoelectric conversion element 1001 shown in FIG. 19.

Figure 24:
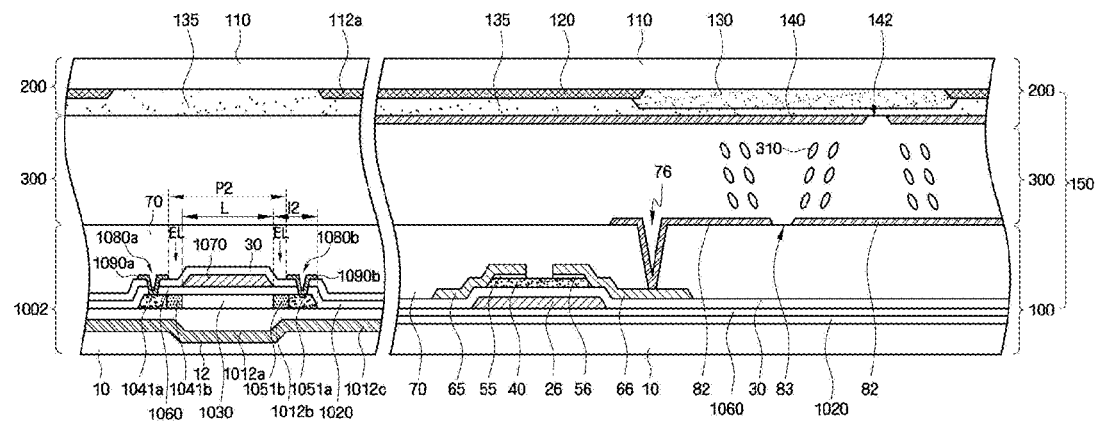
FIG. 24 is a sectional view taken along line B-B' of a liquid crystal panel included in the liquid crystal display shown in FIG. 2.
Figure 25:
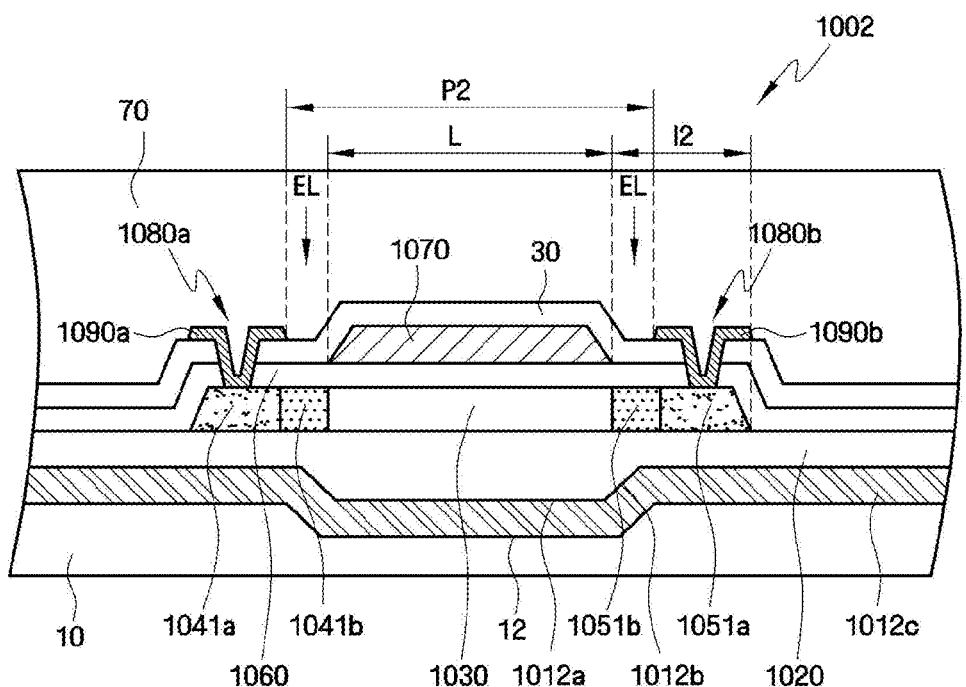
FIG. 25 is an enlarged sectional view of a photoelectric conversion element in the liquid crystal display shown in FIG. 24.

Hereinafter, with reference to FIGS. 24 and 25, a LCD according to some exemplary embodiments of the present invention will be described in detail. FIG. 24 is a sectional view taken along line B-B' of the liquid crystal panel shown in FIG. 2. FIG. 25 is an enlarged sectional view of a photoelectric conversion element in the LCD shown in FIG. 24.

Referring to FIGS. 24 and 25, a trench 12 may be formed in a substrate 10 of a photoelectric conversion element 1002. Reflection patterns 1012a, 1012b, and 1012c may include recessed parts 1012a and 1012b, which may be formed within the trench 12. The trench 12 may be formed in various ways and shapes, including, for example, a trapezoid, a semicircle, and an ellipse. However, the shape of the trench 12 may be limited so that external light EL may reach the first semiconductor region 1030.

The reflection patterns 1012a, 1012b, and 1012c may be conformally formed in the substrate 10 of the photoelectric conversion element 1002, and the recessed parts 1012a and 1012b may be formed to have tilting surfaces 1012b. As described above with reference to FIG. 21, the recessed parts 1012a and 1012b may condense the external light EL onto the first semiconductor region 1030.

Figure 26:
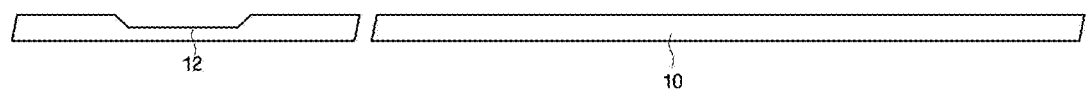
FIG. 26 and FIG. 27 are sectional views illustrating successive processes of a method of fabricating a liquid crystal display according to exemplary embodiments of the present invention.
Figure 27:
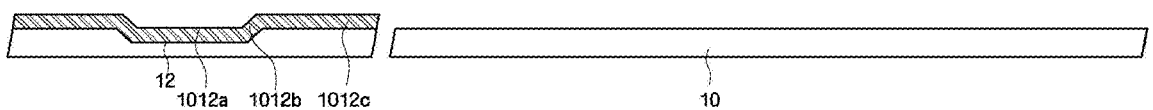

Hereinafter, with reference to FIG. 26 and FIG. 27, a method of fabricating a LCD according to some exemplary embodiments of the present invention will be described. FIG. 26 and FIG. 27 are sectional views illustrating processes of a method of fabricating a LCD according to some exemplary embodiments of the present invention.

Referring to FIG. 26, a trench 12 may be formed by patterning at least one side of a substrate 10 on which a photoelectric conversion element 1002 is to be formed. In general, any suitable method may be used to form the trench 12 including, for example, a wet etching, a dry etching, or a laser irradiation method.

Referring to FIG. 27, reflection patterns 1012a, 1012b, and 1012c may be formed by conformally forming a metal film on the surface of at least one side of the substrate 10 on which the photoelectric conversion element 1002 is to be formed, and in the trench 12. Accordingly, the reflection patterns 1012a, 1012b, and 1012c may include recessed parts 1012a and 1012b having the tilting surfaces 1012b, and a flat part 1012b.

First and second substrates 100 and 200 may then be formed using the processes described above with reference to FIG. 9, FIG. 10, FIG. 11, FIG. 12, FIG. 13, FIG. 14, FIG. 15, FIG. 16, FIG. 17, and FIG. 18, and then attached to each other to form a LCD including the photoelectric conversion element 1002 shown in FIG. 24.

Although preferred embodiments of the present invention have been described for illustrative purposes, it will be apparent to those skilled in the art that various modifications, additions and substitutions can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a substrate;
a thin film transistor array disposed on the substrate; and
a photoelectric conversion element comprising:
a reflection pattern disposed on at least one side of the substrate;
a photoelectric conversion region provided with a first semiconductor region disposed on an upper part of the reflection pattern, the photoelectric conversion region to receive an external light reflected by the reflection pattern; and
a dummy pattern disposed on an upper part of the photoelectric conversion region, the dummy pattern having a width corresponding to the first semiconductor region, and to adjust a quantity of the external light incident to the thin film transistor array.

2. The liquid crystal display of claim 1, wherein the thin film transistor array comprises a plurality of thin film transistors having gate interconnections, and wherein the dummy pattern is comprised of the same material as the gate interconnections.

3. The liquid crystal display of claim 1, wherein the photoelectric conversion region further comprises a second semiconductor region and a third semiconductor region having polarities opposite to each other, the second semiconductor region and the third semiconductor region being disposed on opposite sides of the first semiconductor region.

4. The liquid crystal display of claim 3, wherein the first, second, and third semiconductor regions comprise polysilicon, and the second and third semiconductor regions are doped with P-type and N-type impurities, respectively.

5. The liquid crystal display of claim 3, further comprising a first interconnection pattern and a second interconnection pattern contacting the second semiconductor region and the third semiconductor region, respectively, to connect the second semiconductor region and the third semiconductor region to an external circuit.

6. The liquid crystal display of claim 5, wherein a width of a gap between the first interconnection pattern and the second interconnection pattern is not less than twice a channel length of the first semiconductor region and not more than 10 times the channel length.

7. The liquid crystal display of claim 3, wherein the reflection pattern comprises a recessed part overlapping the first semiconductor region.

8. The liquid crystal display of claim 7, wherein the recessed part comprises a tilted surface having a thickness that is gradually reduced.

9. The liquid crystal display of claim 7, further comprising a trench formed in the substrate, the recessed part being formed in the trench.

10. A method of fabricating a liquid crystal display, comprising:
forming a thin film transistor array on a substrate;
forming a photoelectric conversion element having a reflection pattern disposed on at least one side of the substrate;
forming a photoelectric conversion region comprising a first semiconductor region disposed on an upper part of the reflection pattern to receive an external light reflected by the reflection pattern;
forming a dummy pattern on an upper part of the photoelectric conversion region, the dummy pattern having a width corresponding to the first semiconductor region; and
detecting a quantity of the external light incident to the thin film transistor array.

11. The method of claim 10, wherein forming the thin film transistor array comprises forming a gate interconnection on the substrate, and
wherein forming the dummy pattern and the gate interconnection comprises:
forming a conductive film to implement the gate interconnection on the substrate; and
forming, simultaneously, the dummy pattern and the gate interconnection by patterning the conductive film.

12. The method of claim 11, wherein forming the photoelectric conversion element comprises:
forming a blocking film on the reflection pattern, the blocking film overlapping the reflection pattern; and
forming a preliminary photoelectric conversion region made of polysilicon on the blocking film.

13. The method of claim 12, wherein forming the photoelectric conversion region further comprises:
forming the first semiconductor region corresponding to the dummy pattern; and
forming a second semiconductor region and a third semiconductor region having polarities opposite to each other in the photoelectric conversion region, the second and third semiconductor regions being disposed on opposite sides of the first semiconductor region by injecting impurities having polarities opposite to each other onto the preliminary photoelectric conversion region positioned on opposite sides of the dummy pattern.

14. The method of claim 13, further comprising:
forming a first gate insulating film to cover the preliminary photoelectric conversion region on the substrate before forming the dummy pattern and after forming the preliminary photoelectric conversion region;
forming a second gate insulating film to cover the dummy pattern after forming the dummy pattern; and
forming a first interconnection pattern and a second interconnection pattern contacting the second and third semiconductor regions through the first and second gate insulating films, respectively.

15. The method of claim 14, wherein forming first and second interconnection patterns comprises forming a gap between the first and second interconnection patterns, a width of the gap being not less than twice a width of the first semiconductor region, and not more than 10 times the width of the first semiconductor region.

16. The method of claim 10, wherein forming the photoelectric conversion region further comprises forming a second semiconductor region and a third semiconductor region having polarities opposite to each other, the second and third semiconductor regions being disposed on opposite sides of the first semiconductor regions, and
wherein forming the reflection pattern on at least one side of the substrate comprises:
forming a metal film for the reflection pattern on the substrate; and
forming a recessed region overlapping the first semiconductor region by patterning the metal film.

17. The method of claim 16, wherein patterning the metal film comprises:
forming a tilted surface; and
reducing, gradually, a thickness of the tilted surface by patterning the metal layer.

18. The method of claim 10, further comprising forming a trench in the substrate, and
wherein forming the reflection pattern comprises conformally forming a metal layer for the reflection pattern on a surface of the substrate and in the trench.

* * * * *